United States Patent [19]

Joly et al.

[11] Patent Number: 5,350,722
[45] Date of Patent: * Sep. 27, 1994

[54] MTW-TYPE ZEOLITE AND ITS PREPARATION PROCESS

[75] Inventors: Jean-François Joly, Paris; Philippe Caullet, Illzach; Annie-Catherine Faust, Mulhouse; Jacques Baron, Mulhouse; Jean-Louis Guth, Mulhouse, all of France

[73] Assignee: Institut Francias du Petrole, Rueil Malmaison, France

[ * ] Notice: The portion of the term of this patent subsequent to Dec. 15, 2009 has been disclaimed.

[21] Appl. No.: 920,487
[22] PCT Filed: Dec. 18, 1991
[86] PCT No.: PCT/FR91/01029
  § 371 Date: Aug. 20, 1992
  § 102(e) Date: Aug. 20, 1992
[87] PCT Pub. No.: WO92/11203
  PCT Pub. Date: Jul. 9, 1992

[30] Foreign Application Priority Data
Dec. 21, 1990 [FR] France ............... 90 16256

[51] Int. Cl.$^5$ ............... B01J 29/06
[52] U.S. Cl. ............... 502/64; 423/328.1; 423/329.1; 423/703; 423/706
[58] Field of Search ............ 423/705, 706, 718, 329.1, 423/328.2, 703; 502/64

[56] References Cited

U.S. PATENT DOCUMENTS

| | | | |
|---|---|---|---|
| 4,061,717 | 12/1977 | Kerr et al. | 423/329 |
| 4,331,643 | 5/1982 | Rubin et al. | 423/329 |
| 4,804,647 | 2/1989 | Pellet et al. | 502/64 |
| 5,171,556 | 12/1992 | Caullet et al. | 502/77 |
| 5,187,132 | 2/1993 | Zones et al. | 423/705 |
| 5,194,235 | 3/1993 | Zones . | |

FOREIGN PATENT DOCUMENTS 0124364 6/1986 European Pat. Off. ............ 502/77

OTHER PUBLICATIONS

Journal of the Chemical Society, Chemical Communications, No. 14, Jul. 15, 1988, pp. 920–921, Ed. The Royal Society of Chemistry, Cambridge, GB; M. E. Davis et al.: "Synthesis of gmelinite and ZSM-12 zeolites with a polymer template".

Journal of the Chemical Society, Chemical Communications, No. 19, Oct. 1, 1990, pp. 1313–1314, Ed. The Royal Society of Chemistry, Cambridge, GB; Z. Daging et al.: "Synthesis of large single crystals of pentasil-type silica zeolites from non-alkaline medium".

New Developments in Zeolite Science and Technology, Proceedings of the 7th International Zeolite Conference, Tokyo; Aug. 17–22, 1986, pp. 121–128, Kodansha, Tokyo, JP; J. L. Guth et al.: "New route to pentasyl-type zeolites using a non-alkaline medium in the presence of fluoride ions".

Primary Examiner—Anthony McFarlane
Attorney, Agent, or Firm—Antonelli, Terry, Stout & Kraus

[57] ABSTRACT

The invention relates to a synthetic crystalline zeolite of the MTW type, characterized by:
a) the following approximate general formula:

$$M_{2/n}O, Al_2O_3, xSiO_2$$

in which M represents a metal cation and/or proton, n is the valency of M and x is a number between 14 and 800,
b) a X-ray diagram shown in table I of the description,
c) a fluorine content between approximately 0.005 and 2% by weight, said zeolite having been synthesized in a fluoride medium and accompanied by stirring.

10 Claims, No Drawings

MTW-TYPE ZEOLITE AND ITS PREPARATION PROCESS

The invention relates to a novel MTW-type zeolite and to a process for preparing said zeolite.

Due to their geometrical selectivity and ion exchange properties, zeolites are industrially used on a considerable scale, both in adsorption (e.g. drying gases, separating straight and branched-chain paraffins, separation of aromatic compounds, etc.) and in catalysis (e.g. catalytic cracking, hydrocracking, isomerization, oligomerization, etc.).

The chemical composition of the zeolites containing in their skeleton the elements Si and Al can be represented by the following approximate formula:

$$M_{2/n}, Al_2O_3, xSiO_2$$

in which
M represents a cation of valency n, such as e.g. an alkali metal, alkaline earth or organic cation,
x varying as a function of the structures between 2 and infinity and in which case the zeolite is a microporous silica.

Although numerous aluminosilicate-type zeolites exist naturally, the search for products having novel properties has led over the last few years to the synthesis of a large number of such zeolitic structure aluminosilicates. A novel zeolite, without any known natural equivalent and discovered in the early 1970's is the ZSM-12 zeolite (U.S. Pat. No. 3,832,449). This zeolite is also known under the names CZH-5 (GB-A-2079735), Nu-13 (EP-A-0059059), Theta-3 (EP-A-0162719) and TPZ-12 (U.S. Pat. No. 4,557,919). The zeolite structure carrying these different names is referred to as of the MTW structural type (R. B. LaPierre et al, Zeolites, 5, p. 346, 1985). These MTW-type zeolites are still synthesized in the presence of sodium cations and a very limited number of organic structuring agents. To obtain the MTW zeolite, it is necessary to start with a reaction mixture containing Na+ cations and an organic structuring agent, which can e.g. result from the reaction of triethyl amine and diethyl sulphate.

All MTW-type zeolites have hitherto been synthesized in a conventional medium, i.e. in an alkaline medium at a pH generally exceeding 9, in which the silica mobilizing agent is OH−. Another zeolite synthesis medium has recently been discovered and is in fact the fluoride medium, in which the silica mobilizing agent is the F− anion. In this medium, the pH is generally below 10 (cf. e.g. J. L. GUTH, H. KESSLER and R. WEY, Proc. Int. Zeolite Conf., Tokyo, Aug. 17-22, 1986, p. 121). The synthesis of a limited number of zeolitic structures has already successfully taken place in this novel medium, such as e.g. MFI (French patent application 88/09631) and ferrierite (French patent application 86/16362).

Compared with the alkaline synthesis medium (OH−), the fluoride medium has a certain number of very significant advantages. Thus, in an alkaline medium, most synthesized zeolites are metastable. Thus, during synthesis more stable solid phases may appear and undesired phases are precipitated. This difficulty increases when the quantities to be prepared increase, i.e. on passing from the laboratory to the industrial stage. Moreover, these metastable zeolites in the basic reaction medium are only obtained by a significant supersaturation of active species in the medium, which leads to a rapid nucleation and consequently to crystals of approximately 1 micrometer. However, in certain applications, it may be of interest to have crystals of a larger size, so as to e.g. maintain the thermal stability of the solid.

Numerous applications, particularly in acid catalysis, require zeolites in a proton form completely free from their alkali metal or alkaline earth compensation cations introduced during synthesis. It is possible to obtain the proton form by carrying out repeated, long exchanges with $NH_4^+$ cations, followed by calcination in order to decompose the said cations into protons. These ion exchange stages could be avoided if it was possible to entirely replace the alkali metal or alkaline earth cations by cations decomposable during synthesis, i.e. $NH_4^+$ and/or organic cations. It is not possible to introduce $NH_4^+$ cations into the solid during synthesis in the basic medium because the pH is too high and then $NH_4^+$ would be transformed into $NH_3$. In addition, syntheses carried out at pH-values where the $NH_4^+$ cation is stable are difficult and long due to the limited solubility of the silica sources at these low pH-values.

A supplementary advantage of syntheses carried out in a fluoride medium compared with those carried out in a conventional OH− medium is that solids are obtained, whose acid and ion exchange properties are of different natures. The acid catalysts prepared from solids obtained in the fluoride medium have improved catalytic properties. At this level it is very important to point out that the crystallographic structure of a solid is not sufficient for entirely defining its properties and more particularly its acid properties, which play a vital part in catalysis.

Unlike in the case of their homologs prepared according to the prior art, the MTW-type zeolites prepared according to the invention contain fluorine after the synthesis and elimination of the organic compounds introduced during synthesis. Fluorine, as will be shown hereinafter, gives the MTW zeolites according to the invention special acid and ion exchange properties. Another important advantage of the fluoride synthesis medium is it makes it possible to obtain sodium cation-free MTW zeolites.

The invention therefore relates to a novel, synthetic, crystalline MTW-type zeolite, as well as to a process for the synthesis of said zeolite in which the aforementioned disadvantages are avoided and which also gives to the zeolites according to the invention improved properties and in particular acid properties. The novel zeolite type according to the invention can be used in adsorption and in catalysis. The MTW-type zeolite according to the invention has (after synthesis) the following approximate general formula:

$$M_{2/n}, Al_2O_3, xSiO_2$$

in which M represents a proton and/or a metal cation (n being the valency of M).

It will be shown hereinafter that in a preparation method according to the invention, said metal cation or proton results from the thermal decomposition of at least one cation such as e.g. $NH_4^+$ and/or at least one organic agent such as methyl amine ($CH_3NH_2$) or 1,4-diazabicyclo-(2,2,2)-octane (hereinafter called DABCO) present in the reaction medium and/or at least one non-decomposable metal cation which may or may not have come from the reaction medium such as e.g. an alkali metal and/or alkaline earth cation or some other metal cation defined hereinafter.

The zeolite according to the invention is in particular characterized by:

i) a number x between 14 and 800, preferably between 20 and 800 (x being the $SiO_2/Al_2O_3$ molar ratio), ii) a X-ray diagram shown in table I, iii) a fluorine content between approximately 0.005 and 2% by weight, preferably between approximately 0.01 and 1.5% by weight.

It is also characterized by the fact that it was synthesized in a fluoride medium and in a stirred medium.

This MTW-type zeolite according to the invention generally has at least one dimension of the crystals between 0.1 and 50 μm (1 μm=$10^{-6}$ meter).

The invention also relates to a process for the preparation of said MTW-type zeolite, which consists:

a) of forming a reaction mixture in solution having a pH below approximately 9 and containing water, at least one silica source, at least one aluminium source, at least one mobilizing agent source containing fluoride ($F^-$) ions, at least one source of at least one structuring agent chosen from within the group formed by 1,4-diazabicyclo-(2,2,2)-octane and a mixture of 1,4-diazabicyclo-(2,2,2)-octane and methyl amine, said structuring agent possibly supplying organic cations, optionally an alkali metal and/or alkaline earth cation source, said reaction mixture having a composition, in molar ratio terms, within the following ranges:

Si/Al: 6–300, preferably 10–300,
$F^-$/Si: 0.1–8, preferably 0.2–6,
$H_2O$/Si: 4–50, preferably 10–50,
(R+R')/Si: 0.5–4,
R/R': 0.1-infinity, preferably 0.2-infinity, in which R is DABCO and R' methyl amine (R'=0 in the case where methyl amine is not used).

b) maintaining said reaction mixture under stirring at a heating temperature between approximately 100° and 250° C. and preferably between approximately 150° and 250° C. until a crystalline compound is obtained and c) calcining said compound at a temperature above approximately 350° C. and preferably above approximately 450° C.

The presence, following the calcination stage (stage c)) for eliminating the organic compounds, of fluorine in said MTW-type zeolites according to the invention, at contents preferably between 0.01 and 1.5% by weight leads to modifications of the ion exchange and acid properties of the solids, which are different from the MTW zeolites obtained in a conventional medium. Thus, as a function of the synthesis conditions, the solids according to the invention are characterized by an infrared vibration spectrum in the OH range (3800 to 3500 cm$^{-1}$) having bands attributed to the Si-OH groups (range 3730–3750 cm$^{-1}$) and to the Al-OH groups (range 3580–3640 cm$^{-1}$) which are less intense than those of the prior art MTW zeolites with the same Si/Al ratio. Correlatively the ion exchange capcity of the zeolites according to the invention is generally lower than that of the prior art products.

The MTW zeolites according to the invention, whose hydroxyl content and ion exchange capacities are reduced, surprisingly have remarkable acid properties as is witnessed by the ammonia thermodesorption and the infrared spectroscopy of adsorbed weak bases such as e.g. ethylene and $H_2S$. It is therefore clear that the acidity of the solids according to the invention is of a special nature. Without wishing to be bound by a particular theory, it can be suggested that in the solids according to the invention a more or less large part of the acid sites of the skeleton of type Si-OH-Al is replaced by sites of the type Si-F-Al.

The exact nature of the acid sites contained in the MTW zeolites according to the invention remains to be defined. However, it would seem that the existence of these special sites is linked with the presence of fluorine in the solids or at least results from the fact that the synthesis was carried out in a fluoride medium.

By special treatments it would be possible to eliminate all or part of the fluorine contained in the solids according to the invention without causing any deterioration to their crystallinity. One procedure which can be used for defluorinating said solids consists of carrying out a treatment in a $NH_4OH$ solution at temperatures e.g. between ambient temperature (15° to 25° C.) and 150° C. (treatment under pressure).

It is advantageously possible to heat the reaction medium in an autoclave internally coated with polytetrafluoroethylene (PTFE) between approximately 100 and approximately 250° C. and preferably between approximately 150 and approximately 250° C. for a time which can vary from a few hours to a few days (normally between 8 and 1200 hours), as a function of the reaction temperature adopted, until a crystalline solid is obtained which is separated from the mother liquors by filtration and which is then washed with distilled water. The reaction mixture must be stirred during the heating period in the autoclave in order to obtain the MTW-type solid according to the invention.

Advantageously, it is possible to prepare said reaction mixture at a pH between approximately 4 and approximately 9 and preferably between approximately 6 and approximately 9.

According to a preferred method for the preparation of MTW-type zeolites according to the invention, the molar ratios of the constituents of the reaction mixture are within the following value ranges:

Si/Al: 12–100,
$F^-$/Si: 0.5–4,
$H_2O$/Si: 20–40
(R+R')/Si: 0.9–2.1,
R/R': 0.3-infinity, in which R is DABCO and R' is methyl amine (R'=0 in the case where methyl amine is not used).

It is optionally possible to add to said reaction mixture at least one complementary salt in a complementary salt/$SiO_2$ molar ratio generally between 0.1 and 4 and preferably between 0.2 and 0.5 and/or at least one nucleus of the zeolite formed according to the invention in a zeolite crystal/$SiO_2$ weight ratio generally between 0.01 and 0.1 and preferably between 0.02 and 0.03, in such a way that the morphology, the size of the crystals and the crystallization reaction kinetics can be advantageously controlled.

The pH of the reaction medium, below approximately 9, can be obtained either directly from one or more of the reagents used, or by the addition of an acid, a base, an acid salt, a basic salt or a complementary buffer mixture.

Numerous silica sources can be used. Reference is made to silicas in the form of hydrogels, aerogels and colloidal suspensions, as well as silicas resulting from the precipitation of solutions of soluble silicates or the hydrolysis of silicic esters such as orthosilicic acid tetraethyl ester ($Si(OC_2H_5)$) or complexes such as sodium fluorosilicate Na₂SiF₆ or ammonium fluorisilicate (NH₄)₂SiF₆.

Among the aluminium sources used, preference is given to the choice of aluminium chloride hydrate (AlCl₃, 6H₂O), aluminium nitrate hydrate (Al(NO₃)₃, 9H₂O), aluminium sulphate with 16 molecules of water or aluminium fluoride trihydrate AlF₃, 3H₂O. Reference can also be made to pseudoboehmite.

Moreover, instead of starting with separate silica and aluminium sources, it is also possible to use sources where the two elements are combined, such as e.g. a freshly precipitated aluminosilicate gel.

The fluoride anions F⁻ can be introduced in the form of salts of said structuring agents or ammonium or alkali metals such as e.g. NaF, NH₄F, NH₄HF₂ or in acid form such as HF, or in the form of hydrolyzable compounds able to release fluoride anions in water such as silicon fluoride SiF₄ or ammonium fluorosilicate (NH₄)₂SiF₆ or sodium fluorosilicate Na₂SiF₆.

The acids or acid bases, bases or basic salts optionally added for bringing the pH of the reaction medium to the desired value can be chosen from among standard acids such as e.g. HF, HCl, HNO₃, H₂SO₄, CH₃COOH or acid salts such as e.g. NH₄HF₂, KHF₂, NaHSO₄, standard bases such as e.g. NaHCO₃, Na₂S, NaHS or buffer mixtures such as e.g. (CH₃COOH, CH₃COONa) or (NH₄OH, NH₄Cl).

Calcination (stage c) advantageously takes place at a temperature between approximately 520° and 800° C. in a dry gas atmosphere, such as e.g. air or inert gas, so as to decompose the structuring agent present in the pores of the zeolite.

Following the stage of eliminating the organic compound (stage c) and optionally partial or total defluorination, it is possible to introduce into the MTW-type zeolite according to the invention and using well known ion exchange methods, at least one element from the periodic classification, whose cations can be prepared in an aqueous medium and chosen from within the family constituted by groups IIA, IIIA, IB, IIB, IIIB, IVB and VIIIA of the period classification of elements. Reference is e.g. made to alkali metal, alkaline earth or rare earth cations Fe'', Fe''', Co'', Co''', Ni'', Cu'', Zn'', Ag', Pt''.

The identification of the MTW-type zeolites according to the invention can take place easily on the basis of their X-ray diagram, which can be obtained with the aid of a diffractometer using the conventional powder method with $K\alpha$ radiation of the copper. An internal standard makes it possible to accurately determine the values of the angles $2\theta$ associated with the diffraction peaks. The different interplanar spacings $d_{hkl}$ characteristic of the sample are calculated on the basis of Bragg's law. The estimation of the measuring errors $\Delta d_{hkl}$ on $d_{hkl}$ is calculated as a function of the absolute error $\Delta(2\theta)$ allocated to the measurement of $2\theta$ by Bragg's law. In the presence of an internal standard, this error is minimized and is taken as equal to $\pm 0.05°$. The relative intensity I/Io allocated to each value of $d_{hkl}$ is estimated on the basis of the height of the corresponding diffraction peak. The latter can also be determined on the basis of a radiograph obtained with the aid of a powder camera.

Table I shows the X-ray diagram of the MTW-type zeolites according to the invention. The values relate to $K\alpha$ radiation copper ($\lambda = 1.5418$ Å), the data having been obtained with the aid of an automatic Phillips APD1700 Diffractometer (Line Fine Focus tube). The MTW zeolite according to the invention can be used alone or mixed with a matrix within a catalyst.

After synthesis, the zeolite can e.g. be shaped using a matrix, which may be inert or active for the reaction to be promoted. The matrixes used are generally chosen from within the group formed by clays, aluminas, silica, magnesia, zirconia, titanium dioxide, boron trioxide and any combination of at least two of the above compounds such as silica-alumina, silica-magnesia, etc. All known agglomeration and shaping methods can be used, such as e.g. extrusion, pelletizing, drop coagulation, etc.

The catalyst then has a weight content of the MTW-type zeolite according to the invention generally between 20 and 99.5%, preferably between 40 and 95% and a matrix weight content generally between 0.5 and 80% and preferably between 5 and 60%.

The catalyst containing the MTW structure zeolite according to the invention can also contain a hydrogenating or dehydrogenating function constituted in general by at least one metal and/or metal compound chosen from among groups IA, VIB (Cr, Mo, W) and VIII of the periodic classification of elements, e.g. platinum, palladium and/or nickel.

TABLE I

| $2\theta(°)$ | I/Io | $2\theta(°)$ | I/Io |
| --- | --- | --- | --- |
| 7.45 | 82 | 26.37 | 13 |
| 7.66 | 56 | 26.89 | 12 |
| 8.88 | 30 | 28.02 | 9 |
| 12.15 | 2 | 28.51 | 3 |
| 14.79 | 5 | 29.35 | 5 |
| 15.28 | 6 | 30.98 | 6 |
| 18.76 | 10 | 31.79 | 2 |
| 19.14 | 11 | 32.89 | 1 |
| 20.05 | 7 | 33.83 | 3 |
| 20.91 | 100 | 35.68 | 14 |
| 21.91 | 8 | 36.51 | 2 |
| 22.43 | 15 | 36.99 | 3 |
| 23.05 | 39 | 38.49 | 2 |
| 23.31 | 28 | 43.84 | 1 |
| 23.88 | 5 | 44.64 | 4 |
| 24.52 | 4 | 45.64 | 2 |
| 25.20 | 6 | 46.88 | 2 |
| 25.77 | 7 | | |

The following examples illustrate the invention without limiting its scope.

EXAMPLE 1

3.37 g of DABCO (0.03 mole) and 2.33 g of aqueous solution with 40% methyl amine (0.03 mole of methyl amine) are dissolved in 17.7 g of water. To this solution are added dropwise and accompanied by stirring 3 g of an aqueous solution with 40% HF (0.06 mole of HF). To the mixture obtained is added accompanied by stirring 0.14 g of pseudoboehmite with 24.6% by weight water (i.e. $2 \cdot 10^{-3}$ mole of Al) and 4.23 g of Merck silica with 15% water (i.e. 0.06 mole of SiO₂) and finally approximately 70 mg of MTW-type zeolite crystals synthesized in a carefully ground fluoride medium (approximately 2% by weight based on the silica used). This reaction mixture is stirred for 10 minutes at ambient temperature.

The composition of the reaction mixture in molar ratio terms is as follows:

Si/Al=30; F⁻/Si=1; (R+R')/Si=1; R/R'=1 and H₂O/Si=20

The reaction mixture is then transferred into a TEFLON-coated 75 ml autoclave, the reaction taking place at 200° C. for 24 hours. During synthesis, the autoclave is continuously stirred, the longitudinal shaft of the autoclave rotating at a speed of approximately 15 revolutions per minute (r.p.m.) in a plane perpendicular to the rotation axis. After the reaction, the autoclave is cooled, the crystalline solid is collected by filtration, washed with distilled water and dried at 80° C. for 24 hours. The pH of the reaction medium before and after the reaction is approximately 8.

The X-ray diffraction spectrum of the collected product is similar, after calcination in air at 550° C., to that of table I of the description (MTW-type structure). Examined under the electron scanning microscope, said zeolite is in the form of fine interlaced needles of average dimensions 5×0.2 μm. The $SiO_2/Al_2O_3$ molar ratio of the solid obtained is 126, the fluorine weight content, after calcination in air at 550° C., being 0.5%.

EXAMPLE 2

A reaction mixture having an identical composition to that of example 1 is transferred into a TEFLON-coated 75 ml autoclave. The autoclave is heated to 170° C. for 12 days under the same stirring conditions as in example 1. The collected, washed and dried solid has, after calcination in air at 550° C., a X-ray diagram identical to that of table I. Its $SiO_2/Al_2O_3$ molar ratio is equal to 90, its fluorine weight content after calcination in air at 50° C. being 0.25%.

EXAMPLE 3

A reaction mixture, whose molar composition is given hereinafter, is prepared according to an operating procedure identical to that of example 1. The quantities of the reagents used are the same, except with regards to the pseudoboehmite which is in this case 40 mg (i.e. $6 \cdot 10^{-4}$ mole of Al) instead of 0.14 g. The molar composition of the reaction mixture is then as follows:

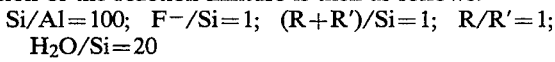
Si/Al=100; F−/Si=1; (R+R′)/Si=1; R/R′=1; H2O/Si=20

After transfer into a TEFLON-coated 75ml autoclave, the reaction mixture is heated to 170° C. for 5 days and accompanied by stirring. After reaction, the solid obtained is collected by filtration, washed with distilled water and dried. After calcination in air at 550° C., it has a X-ray diagram identical to that of table I. Its $SiO_2/Al_2O_3$ molar ratio is 200 and after calcining in air at 550° C., its fluorine weight content is 0.7%.

EXAMPLE 4

3.37 g of DABCO (0.03 mole) and 2.32 g of aqueous solution with 40% methyl amine (0.03mole of methyl amine) are dissolved in 18.4 g of water. To this solution are added dropwise and accompanied by stirring 3 g of an aqueous solution with 40% HF (0.06 mole of HF). To the mixture obtained are added, accompanied by stirring, 83 mg of $AlF_3,3H_2O$ (0.01 mole of Al) and 4.23 g of Merck silica with 15% water (i.e. 0.06 mole of $SiO_2$) and finally approximately 70 mg of MTW-type zeolite crystals synthesized in a carefully ground fluoride medium (approximately 2% by weight based on the silica used). This reaction mixture is stirred for 10 minutes at ambient temperature. The composition of the reaction mixture in molar ratio terms is as follows:

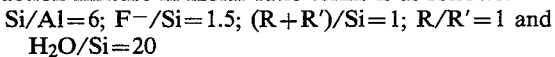
Si/Al=6; F−/Si=1.5; (R+R′)/Si=1; R/R′=1 and H2O/Si=20

The reaction mixture is then transferred into a TEFLON-coated 75 ml autoclave, the reaction taking place at 200° C. for 2 days. During synthesis, the autoclave is continuously stirred, the longitudinal shaft of the autoclave rotating at a speed of approximately 15 r.p.m. in a plane perpendicular to the rotation axis. After reaction, the autoclave is cooled, the crystalline solid collected by filtration, washed with distilled water and dried at 80° C. for 24 hours. The pH of the reaction medium before and after the reaction is approximately 8.

The X-ray difference spectrum of the collected product is, after calcining in air at 550° C., similar to that of table I (MTW-type structure). Examined under the electron scanning microscope the zeolite is in the form of fine interlaced needles of length 20 to 30 μm. The $SiO_2/Al_2O_3$ molar ratio of the solid is close to 38, its fluorine weight content after calcining in air at 550° C. being 0.55%.

We claim:

1. Synthetic crystalline zeolite of the MTW type characterized by:

a) the following approximate general formula:

   $M_{2/n}O, Al_2O_3, xSiO_2$ in which M represents a metal cation and/or a proton, n is the valency of M and x is a number between 14 and 800, b) a X-ray diagram shown in table I of the description, c) a fluorine content between approximately 0.005 and 2% by weight, said zeolite having been synthesized in a fluoride medium, accompanied by stirring.

2. Zeolite according to claim 1, characterized in that x is a number between 20 and 800.

3. Zeolite according to either of the claims 1 and 2, characterized in that it has a fluorine content between approximately 0.01 and 1.5% by weight.

4. Catalyst containing a zeolite according to claim 1 wherein said catalyst further comprises a matrix.

5. Catalyst containing a zeolite according to claim 1 wherein said catalyst further comprises a matrix at least one metal and/or metal compound chosen from among groups IA, VIB and VIII of the periodic classification of elements.

6. Process for the preparation of a zeolite according to claim 1, characterized in that:

a) a reaction mixture in solution is formed having a pH below approximately 9 and containing water, at least one silica source, at least one aluminium source, at least one mobilizing agent source containing fluoride ions (F−), at least one source of at least one structuring agent chosen from within the group formed by 1,4-diazabicyclo-(2,2,2)-octane and a mixture of 1,4-diazabicyclo-(2,2,2)-octane and methyl amine, said structuring agent optionally supplying organic cations, said reaction mixture having a composition, in molar ratio terms, within the following value ranges:

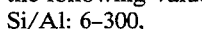
   Si/Al: 6–300,
   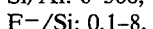
   F−/Si: 0.1–8,
   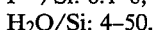
   H2O/Si: 4–50,
   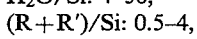
   (R+R′)/Si: 0.5–4,
   R/R′: 0.1-infinity, in which R is 1,4-diazabicyclo-(2,2,2)-octane and R′ is methyl amine.

b) the said reaction mixture is maintained under stirring at a heating temperature between approximately 100° and 250° C. until a crystalline compound is obtained and c) said compound is calcined at a temperature above approximately 350° C.

7. Process according to claim 6, wherein, in stage a), the reaction mixture has a composition, in molar ratio terms, within the following value ranges:

Si/Al:10–300,
F−/Si:0.2–6,
H$_2$O/Si:10–50,
(R+R')/Si:0.5–4,
R/R':0.2–infinity, in which R is 1,4-diazabicyclo-(2,2,2)-octane and R' is methyl amine.

8. Process according to claim 6, wherein, in stage a), said reaction mixture has a composition, in molar ratio terms, within the following value ranges:

Si/Al:12–100
F−/Si:0.5–4,
H$_2$O/Si:20–40,
(R+R')/Si:0.9–2.1,
R/R':0.3–infinity in which R is 1,4-diazabicyclo-(2,2,2)-octane and R' is methyl amine.

9. Process according to any one of the claims 6 to 8, wherein, in stage a), said reaction mixture also incorporates an alkali metal and/or alkaline earth cation source.

10. Process according to claim 9, wherein, in stage b), said reaction mixture is maintained at a heating temperature between approximately 150° and 250° C., the reaction mixture being kept under stirring until a crystalline compound is obtained.

* * * * *